United States Patent
Kim et al.

(10) Patent No.: US 7,164,781 B2
(45) Date of Patent: Jan. 16, 2007

(54) METHOD AND APPARATUS OF RECOGNIZING FACE USING 2ND-ORDER INDEPENDENT COMPONENT ANALYSIS (ICA)/PRINCIPAL COMPONENT ANALYSIS (PCA)

(75) Inventors: Hyun-woo Kim, Kyungki-do (KR); Tae-kyun Kim, Kyungki-do (KR); Seok-cheol Kee, Kyungki-do (KR); Jong-ha Lee, Kyungki-do (KR); Won-jun Hwang, Seoul (KR); Chang-kyu Choi, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 691 days.

(21) Appl. No.: 10/377,752

(22) Filed: Mar. 4, 2003

(65) Prior Publication Data

US 2003/0165260 A1    Sep. 4, 2003

(30) Foreign Application Priority Data

Mar. 4, 2002   (KR)   .................. 10-2002-0011428
Sep. 28, 2002  (KR)   .................. 10-2002-0059141

(51) Int. Cl.
*G06K 9/00*   (2006.01)
(52) U.S. Cl. ................... 382/118; 382/190
(58) Field of Classification Search ........... 382/118, 382/160, 181, 190, 209, 218, 228, 305; 707/3, 707/6

See application file for complete search history.

(56) References Cited

U.S. PATENT DOCUMENTS 5,710,833 A * 1/1998 Moghaddam et al. ....... 382/228
6,826,300 B1 * 11/2004 Liu et al. .................. 382/159

FOREIGN PATENT DOCUMENTS

KR   2002-0050126   6/2002

OTHER PUBLICATIONS

Qi, et al. "Hybrid Independent Component Analysis and Support Vector Machine Learning Scheme for Face Detection", IEEE, pp. 1481-1484, 2001.*

Bartlett, et al "Face Image Analysis by Unsupervised Learning and redundancy Reduction", University of California, pp. 1-151, 1998.*

(Continued)

*Primary Examiner*—Daniel Miriam
(74) *Attorney, Agent, or Firm*—Buchanan Ingersoll & Rooney PC

(57) ABSTRACT

A method and apparatus for recognizing and searching for a face using 2nd-order independent component analysis (ICA) are provided. The method includes performing PCA on an input original image and generating a low-pass filtered image by removing high-frequency component from the original image, subtracting the low-pass filtered image from the original image and obtaining residual image having only frequency-components, and performing ICA on the residual image and generating feature information corresponding to the original image. While an original ICA subtracts independent components (i.e., independent basis components) from gray scale images, the proposed 2nd-order ICA is robust to illumination variation since it is applied to make the remaining images correspond to high pass frequency components.

20 Claims, 8 Drawing Sheets

OTHER PUBLICATIONS

Kamei, Toshio, "*Face Retrieval by an Adaptive Mahalanobis Distance Using a Confidence Factor*," IEEE ICIP, 2002, pp. I-153-I-156.

Bartlett, Marian Stewart, "*Independent component representations for face recognition*," Proceedings of SPIE Symposium on Electronic Imaging: Science and Technology: Conference on Human Vision and Electronic Imaging III, San Jose, California, Jan. 1998.

Kim, Hyun-Chul, et al., "*Face Retrieval Using $1^{st}$ —and $2^{nd}$ -Order PCA Mixture Model*," IEEE ICIP, 2002, pp. II-605-II-608.

Wang, Lei, et al. "*A New Proposal for Face Feature Description*" International Organisation for Standardisation Organisation Internationale de Normalisation ISO/IEC JTC1/SC29/WG11 Coding of Moving Pictures and Audio, 2000.

Nefian, Ara, et al. "*Standard Support for Automatic Face Recognition*" Organisation for Standardisation Organisation Internationale de Normalisation ISO/IEC JTC1/SC29/WG11 Coding of Moving Pictures and Audio, 2001.

Korean Patent Office Action and English Translation.

Stewart Barlett M. et al., "Independent component representations for face recognition", Proceedings of the Spie—The Interntional Society For Optical Engineering Spie-Int. Soc. Opt. Eng. USA, vol. 3299, 1988, pp. 528-539.

M.S. Bartlet, "Face Image Analysis by Unsupervised Learning", 2001, Kluwer, Norwll, Massachusets, USA, pp. VII-p. IX, p. 46-48, p. 117-119.

Stewart Bartlett M. et al., "Viewpoint Invariant Face Recognition Using Independent Component Analysis and Attractor Networks", Advances in Neural Information Processing Systems, Dec. 2, 1996, pp. 817-823.

Shakunaga T. et al., "Decomposed eigenface for face recognition under various lighting conditions", Proceedings 2001 IEEE Conference on Computer Vision and pattern Recognition. CVPR 2001, Kauai, Hawaii, Dec. 8-14, 2001, Proceedings of the IEEE Computer Conferene on Computr Vision and pattern Recognition, Los Alamitos, CA, IEEE Comp. Soc., US, vol. 1 of 2, Dec. 8, 2001, pp. 864-871.

Wang & T. K. Tan L, "Experimental Results of Face Description based on the $2^{nd}$ order Eigenface Method", ISO/IEC JTC1/SC29/WG11 MPEG2000/M6001, XX, XX, May 2000, pp. 1-35.

Wang & T. K. Tan L., "Iso/IEC JTC1/SCA New Proposal for Face Feature Description", ISO/IEC JTC1/SC29/WG11 MPEG2000/M5750, XX, XX, Mar. 2000, pp. 1-6.

H-C Kim et al., "Proposal for Face Description Using $2^{nd}$-order PCA Mixture Model", ISO/IEC JTC1/SC29/WG11 MPEG2001/M7286, XX, XX, Jul. 2001, pp. 1-8.

S. Gong et al., "Dynamic Vision: from Images to Face Recognition", 2000, Imperial College Press, London, UK, pp. 298-300, p. 176.

Belhumeur P. N. et al., "Eigenfaces VS. Fisherfaces: Recognition Using Class Specific Linear Projection", IEEE Transactions on Pattern Analysis and Machine Intelligence, IEEE Inc., New York, US, vol. 19, No. 7, Jul. 1997, pp. 711-720.

A. Hyvarinen et al., Independent Component Analysis, 2001, John Wiley, New York, USA, pp. 267-268, p. 125.

European Search Report dated Dec. 30, 2004.

\* cited by examiner

FIG. 1
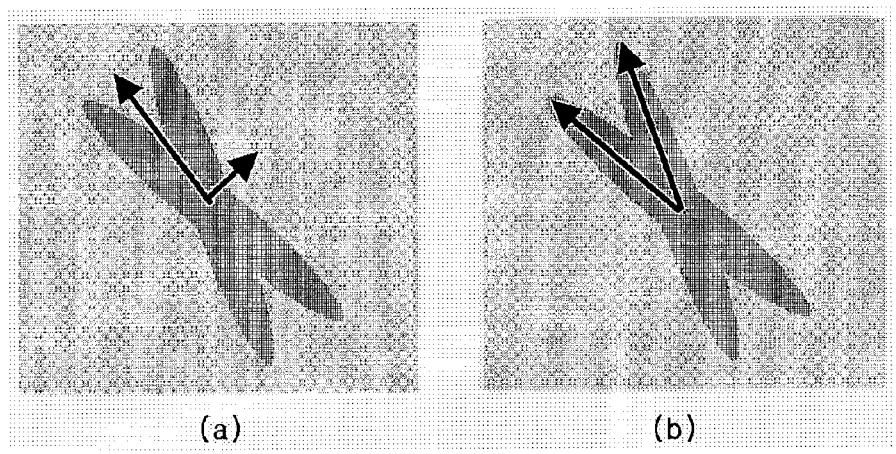
(a)　　　　　　　　(b)
FIG. 2
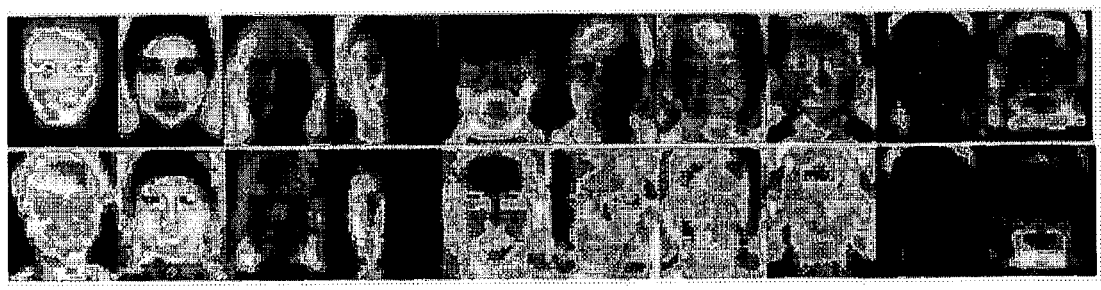
FIG. 3

METHOD AND APPARATUS OF RECOGNIZING FACE USING 2ND-ORDER INDEPENDENT COMPONENT ANALYSIS (ICA)/PRINCIPAL COMPONENT ANALYSIS (PCA)

This application claims priority from Korean Patent Application No. 2002-11428, filed on Mar. 4, 2002, and Korean Patent Application No. 2002-59141, filed on Sep. 28, 2002, the contents of which are incorporated herein in their entirety by reference.

BACKGROUND OF THE INVENTION

1. Field of the Invention

The present invention relates to a method and apparatus of recognizing and searching for a face using 2nd-order independent component analysis (ICA).

2. Description of the Related Art

In the context of image processing and interpretation, a human face is an important factor in visual determination and identification. Since the early 1990's, extensive research into face recognition and facial expression interpretation has been conducted. Recently, MPEG-7 face descriptors have been proposed for face search and identification in a series of images. The face descriptors should offer rapid and accurate search of the same images as those to be extracted, compared to conventional face recognition algorithms. One of challenging problems in face recognition is how to operate on combinations of images showing great changes in illumination. Many different approaches to solving this problem have been developed.

Wang and Tan proposed a 2nd-order eigenface method for illumination-invariant face description. Kamei and Yamada extended the scope of work to use reliable features in order to describe facial symmetry and changes in illumination in different environments. For face description, Nefian and Davies used an embedded Hidden Markov Model (eHMM) approach based on discrete cosine transform (DCT), and Kim et al. developed a 2nd-order PCA mixture model (PMM).

A 2nd-order PCA method was proposed by Wang and Tan based on the observations that principal components corresponding to leading eigenvalues describe illumination changes rather than identity. First, PCA is performed on a set of training images. Images reconstructed from leading principal components corresponding to a first ten eigenvalues represent low-frequency components so the leading eigenvalues are sensitive to illumination variation. Then, the training images are obtained by subtracting the leading principal components from the reconstructed image. These images are called residual images and contain high-frequency components that are less sensitive to illumination variation. Lastly, the PCA is performed on the residual images obtained by subtracting illumination variant features.

Also, a 2nd-order PCA mixture model was introduced by Kim et al. to evaluate the probability distribution of various patterns in the facial image space. Kamei and Yamada added reliable features in order to describe facial symmetry and changes illumination in different environments.

Barlett contended that ICA produces better basis images for face description than PCA, since ICA extracts important information from the facial image space containing higher order relationships among image pixels. This was proven by experimentally, as the experimental results on FERET face datasheet show. As shown in FIG. 1, an ICA representation is superior to a PCA representation, which is due to difference in selection of basis vectors. That is, when a data distribution is not Gaussian, PCA fails to accurately describe the data while ICA is able to appropriately describe the data since PCA basis vectors are orthogonal to each other.

However, the method proposed by Barlett also has a problem in that the satisfactory effect cannot be achieved against a large change in illumination.

SUMMARY OF THE INVENTION

The present invention provides a method and apparatus of generating feature information of a predetermined image using 2nd-order independent component analysis (ICA).

The present invention also provides a method and apparatus of recognizing a facial image using 2nd-order ICA.

The present invention also provides a method and apparatus of searching for a face using 2nd-order ICA.

According to an aspect of the present invention, there is provided a method of generating feature information using 2nd-order independent component analysis (ICA), the method comprising performing PCA on an input original image and generating a low-pass filtered image by removing high-frequency component from the original image, subtracting the low-pass filtered image from the original image and obtaining residual image having only high frequency-components, and performing ICA on the residual image and generating feature information corresponding to the original image.

According to another aspect of the present invention, there is provided a method of recognizing a face using 2nd-order independent component analysis (ICA), the method comprising receiving a first facial image to be recognized and a second facial image as a basis for comparison, performing 2nd-order ICA on the first and second facial images, respectively, and extracting ICA coefficient vectors, and determining whether there is a similarity between the ICA coefficient vectors corresponding to the first and second facial images, and outputting the determination result.

Here, the performing of the 2nd-order ICA comprises performing PCA on the first and second facial images and generating low-pass filtered images corresponding thereto by removing high-frequency components from the first and second facial images, subtracting the low-pass filtered images from the first and second facial images and obtaining residual images having only high-frequency components, respectively, and performing ICA on the residual images corresponding to the first and second facial images and generating ICA coefficient vectors corresponding to the first and second facial images.

Also, the determining of a similarity comprises determining that the first and second facial images are from the same person if a value obtained by dividing the inner product of a pair of vectors corresponding to the first and second facial images by the product of the norms of the two vectors, is greater than a predetermined value.

In accordance with still another aspect of the present invention, there is provided a method of searching for a face using 2nd-order ICA, the method comprising constructing a database (DB) in which facial images of one or more persons and identification information of the persons are stored, receiving an arbitrary facial image to be searched for from the DB, performing the 2nd-order ICA on the facial image to be searched for and generating ICA coefficient vectors, sequentially reading facial images stored in the DB, and performing the 2nd-order ICA on the facial images and generating ICA coefficient vectors, comparing the ICA coefficient vectors corresponding to the facial image received from the DB with the ICA coefficient vectors corresponding to the facial image to be searched for, and determining whether the two facial images are from the same person, if it is determined that the two facial images are from the same person, reading identification information corresponding to the facial image from the DB and outputting the same.

The ICA coefficient vectors is generated by performing PCA on the facial image and generating low-pass filtered image by removing high-frequency components from the facial image, subtracting the low-pass filtered image from the facial images and obtaining residual image corresponding to the facial image, and performing ICA on the residual image and generating ICA coefficient vectors.

The comparing of the ICA coefficient vectors corresponding to the facial image received from the DB with the ICA coefficient vectors corresponding to the facial image to be searched for, comprises determining that the first and second facial images are from the same person if a value obtained by dividing the inner product of a pair of vectors corresponding to the same components of the first and second facial images by the product of the absolute values of the two vectors, is greater than a predetermined value.

In accordance with still another aspect of the present invention, there is provided a method of searching for a face using 2nd-order ICA, the method comprising constructing a database (DB) in which ICA coefficient vectors corresponding to facial images of one or more persons and identification information of the persons are stored, receiving an arbitrary facial image to be searched for from the DB, performing the 2nd-order ICA on the facial image to be searched for and generating ICA coefficient vectors, and searching for ICA coefficient vectors corresponding to the facial image belonging to the same person as identified by the facial image to be searched for, according to a similarity between the ICA coefficient vectors stored in the DB and those corresponding to the facial image to be searched for, and outputting the same.

The performing of the 2nd-order ICA comprises performing PCA on the facial image and generating low-pass filtered image by removing high-frequency components from the facial image, subtracting the low-pass filtered image from the facial image and obtaining residual image corresponding to the facial image, and performing ICA on the residual image and generating ICA coefficient vectors.

Alternatively, there is provided an apparatus of generating feature information comprising a low-pass filtering portion which performs PCA on input original image and generates low-pass filtered image by removing high-frequency components from the original image, a residual image generator which subtracts the low-pass filtered image from the input original image and generates residual image having only the high-frequency components, and an ICA coefficient matrix calculator which performs ICA on the residual image and generates feature information corresponding to the original image.

According to another aspect of the present invention, there is provided an apparatus of recognizing a face using 2nd-order ICA, the apparatus comprising an input portion which receives a first facial image to be recognized and a second facial image as a basis for comparison with the first facial image, a feature information generator which performs 2nd-order ICA on the first and second facial images and generates ICA coefficient matrices, and a comparator which compares an ICA coefficient vector corresponding to the first facial image with that of the second facial image to determine whether there is a similarity therebetween, and outputs the determination result.

Here, the feature information generator may comprise a low-pass filtering portion which performs PCA on input original image and generates low-pass filtered image by removing high-frequency components from the original image, a residual image generator which subtracts the low-pass filtered image from the input original image and generates residual image having only the high-frequency components, and an ICA coefficient matrix calculator which performs ICA on the residual image and generates feature information corresponding to the original image.

According to another aspect of the present invention, there is provided an apparatus of searching for a face using 2nd-order ICA, the apparatus comprising an input portion which receives facial images used in constructing a facial image information database (DB) for searching for a face or a facial image to be searched for among the facial images used in constructing the DB, a feature information generator which performs 2nd-order ICA on the facial images supplied from the input portion and generating feature information corresponding to the facial images, a DB managing portion which stores the feature information corresponding to the facial images used in constructing the DB, supplied from the feature information generator, and manages the information to be stored in the DB, and a comparator which receives the feature information corresponding to the facial image to be searched for, from the feature information generator, searches for feature information whose similarity with the received feature information to be searched for is greater than a predetermined reference value, and determines that the two facial images are from the same person.

Here, the DB managing portion receives and stores the facial images used in constructing the DB from the input portion. The comparator sequentially reads facial images and supplies the same to the feature information generator, receives pieces of feature information corresponding to the facial images, compares the same with the feature information corresponding to the facial image to be searched for to obtain the similarity between the two facial images, and determines whether the two facial images are from the same person according to similarity between the two facial images. The feature information generator receives the facial image to be searched for from the input portion and the facial image in the DB from the comparator, performs the 2nd-order ICA on the facial images and generates pieces of feature information corresponding to the facial images to then supply the same to the comparator.

Also, the feature information may include ICA coefficient vectors. The feature information generator comprises a low-pass filtering portion which performs PCA on input original image and generates low-pass filtered image by removing high-frequency components from the original image, a remaining image generator which subtracts the low-pass filtered image from the input original image and generates residual image having only the high-frequency components, and an ICA coefficient matrix calculator which performs ICA on the residual image and generates feature information corresponding to the original image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above objects and advantages of the present invention will become more apparent by describing in detail preferred embodiments thereof with reference to the attached drawings in which:

FIGS. 1A and 1B show principal component analysis (PCA) and independent component analysis (ICA), respectively;

FIG. 2 conceptually shows ICA representation of a facial image;

FIG. 3 shows a first ten basis images extracted with 1st-order PCA on the first line and first ten basis images extracted with 1st-order ICA on the second line;

DETAILED DESCRIPTION OF THE INVENTION

Figure 4:
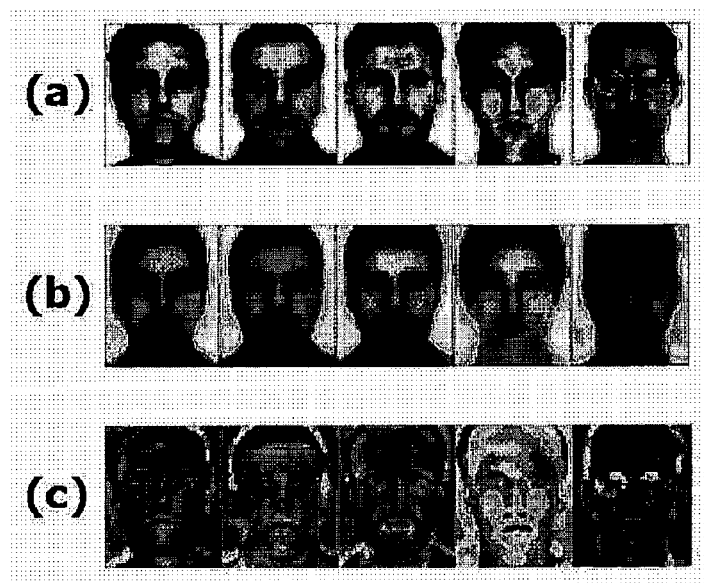
FIG. 4A shows original facial images.
FIG. 4B shows images reconstructed using a first ten principal components extracted with ICA.
FIG. 4C shows residual images extracted with ICA on the third line.

The present invention will now be described in detail.

In the present invention, 2nd-order independent component analysis (ICA) has been adopted in order to describe a facial image space and improve recognition performance in a combination of illumination changes.

The 2nd-order ICA descriptor proposed in the present invention will now be described in detail.

ICA will first be explained. It is assumed that a combination of M images are given as training images from which basis images are extracted, and ($\phi_i$ is a raster-scanned vector corresponding to an i-th training image having a dimensionality N, where N is the number of pixels and M is typically smaller than N (M<N). The mean vector m of the combination of images is $$\frac{1}{M}\sum_{i=1}^{M}\phi_i.$$

The mean vector is subtracted from the raster-scanned vector $\phi$ of each training image to obtain $X_i = \phi_i - m$, which is an M×N matrix $X = [x_1, \ldots, x_M]^T$, having zero mean. Here, a covariance matrix of data is represented by $X^T X$. Since the goal of ICA is to find an N×N invertible matrix $W^{(0)}$, the rows of $U^{(0)} = W^{(0)} X$ are statistically independent, and facial images X are used as basis images. That is, $W^{(0)-1} U^{(0)}$ is represented by independent rows $U^{(0)}$. As shown in FIG. 2, an ICA representation of the facial images x is a linear combination of basis images $u_i$ where i is an integer ranging from 1 to N. To achieve illumination invariant face description, the original ICA algorithm is extended to 2nd-order ICA.

The 2nd-order ICA adopted in the present invention will now be described in detail.

PCA is performed on an original facial image X to extract eigenvalues and eigenvectors of M training images. To describe low-frequency components of the facial images, a first maximum eigenvector $M_1$ is selected ($M_1 < M$), and a leading eigenvector $R_{M1}$, which is the projection of data for $M_1$, is defined by Equation (1):

$$R_{M1} = X P_{M1} \quad (1)$$

where $P_{M1} = [P_1, \ldots, P_{M1}]$ denotes a set of selected eigenvectors and $P_i$ denotes an eigenvector corresponding to an i-th maximum eigenvalue. To reduce the number of independent sources to a tractable number and achieve a simple reconstruction, ICA is performed on $P^T_{M1}$ in place of X. This yields an independent basis image $U_{M1}$ for $M_1$ which is defined by Equation (2):

$$U_{M1} = W_{M1} P^T_{M1} \quad (2)$$

where $W_{M1}$ denotes a convertible $M_1 \times M_1$ weight matrix that makes the rows of $U_{M1}$ statistically independent of each other. The weight matrix $W_{M1}$ is evaluated by algorithm [7] developed by Bell and Sejnowski, and a corresponding matrix $U_{M1}$ contains statistically independent basis images which are a low-pass filtered version of training images. A low-pass filtered facial image $\bar{X}$ is calculated by multiplying $P^T_{M1}$ by both sides of Equation (1), and can be defined as shown in Equation (3):

$$\begin{aligned}\bar{X} &= R_{M1} P^T_{M1} \\ &= (X P_{M1})(W^{-1}_{M1} U_{M1}) \\ &= (X P_{M1} W^{-1}_{M1}) U_{M1}\end{aligned} \quad (3)$$

That is, the low frequency component $\bar{X}$ is spanned by the independent basis image $U_{M1}$ and ICA coefficient $B_{M1}$ is represented as $X P_{M1} W_{M1}^{-1}$. Eventually, the 1st-order ICA transformation matrix $T_{M1}$ is calculated by $T_{M1} = P_{M1} W_{M1}^{-1}$. Examples of basis images $P_{M1}$ and $U_{M1}$ are illustrated in FIG. 3.

Next, the residual images corresponding to high-pass filtered images are calculated by subtracting the original facial images from the reconstructed images corresponding to low-pass filtered images, and ICA is performed on the residual images. An i-th residual image $\Delta x_i$ is represented by $\Delta x_i = x_i - \bar{x}_i$. A residual matrix is defined by $\Gamma \equiv X - \bar{X} = [\Delta x_1, \ldots, \Delta x_M]^T$. Similar to the 1st-order ICA transformation, when ICA is performed on $P'^T_{M2} = [P'_1, \ldots, P'_{M2}]^T$, $P'_i$ denotes an eigenvector corresponding to an i-th maximum eigenvalue and a 2nd-order ICA reconstruction $\Gamma$ of the residual images is given by Equation (4):

$$\bar{\Gamma} = (\Gamma P'_{M2} W'^{-1}{}_{M2}) U'_{M2} \qquad (4)$$

where $U'_{M2}$ and $W'_{M2}$ denote an independent basis image for $M_2$ and a convertible $M_2 \times M_2$ weight matrix that makes the rows of $U'_{M2}$ statistically independent of each other. Equation (4) may be reexpressed as Equation (5) in terms of the original matrix X using $\Gamma \equiv X - \bar{X}$:

$$\begin{aligned}\Gamma &= (X - \bar{X})(P'_{M2} W'^{-1}_{M2}) U'_{M2} \\ &= (X - X P_{M1} W^{-1}_{M1} U_{M1})(P'_{M2} W'^{-1}_{M2}) U'_{M2} \\ &= [X(P'_{M2} W'^{-1}_{M2} - P_{M1} W^{-1}_{M1} U_{M1} P'_{M2} W'^{-1}_{M2})] U'_{M2}\end{aligned} \qquad (5)$$

That is, the high frequency component $\Gamma$ is spanned by the independent basis image (or vectors) $U'_{M2}$ and ICA coefficient $B'_{M2}$ is represented as $X(P'_{M2} W'^{-1}{}_{M2} - P_{M1} W^{-1}{}_{M1} U_{M1} P'_{M2} W'^{-1}{}_{M2})$. Eventually, the 2nd-order ICA transformation matrix $T'_{M2}$ is defined by $T'_{M2} = X(P'_{M2} W'^{-1}{}_{M2} - P_{M1} W^{-1}{}_{M1} U_{M1} P'_{M2} W'^{-1}{}_{M2})$. FIG. 4A illustrates examples of original image X, FIG. 4B illustrates its reconstructed low-pass filtered image $\bar{X}$, and FIG. 4C illustrates the residual image $\Gamma$.

To reduce the bit rate and improve the performance of the ICA representation, a subset of ICA coefficients having maximum discriminability values $K_1$ and $K_2$ defined by the ratio of between-class to within-class variances are selected from independent basis images $U_{M1}$ and $U'_{M2}$ and denoted by $U_{K1}$ and $U'_{K2}$. The corresponding transformation matrices $T_{K1}$ and $T'_{K2}$ are defined by Equations (6):

$$T_{K1} = P_{K1} W^{-1}{}_{K1}$$

$$T'_{K2} = P'_{K2} W'^{-1}{}_{K1} - P_{K1} W^{-1}{}_{K1} U_{K1} P'_{K1} W'^{-1}{}_{K2} \qquad (6)$$

Figure 5A:
FIGS. 5A and 5B show thirty basis images selected from a 2nd-order PCA model and thirty basis images selected from a 2nd-order ICA model, respectively.
Figure 5B:
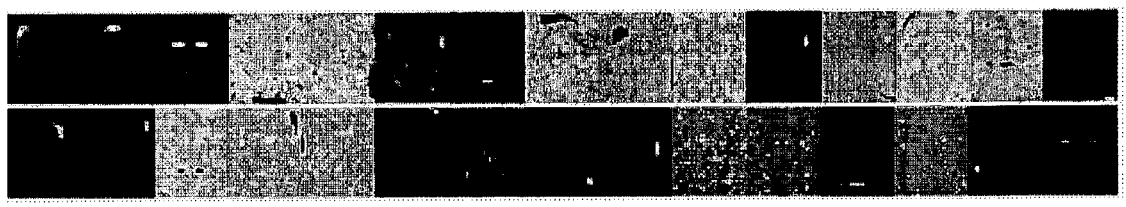

Although the transformation matrices $T_{K1}$ and $T'_{K2}$ are different from $T_{M1}$ and $T'_{M2}$ in terms of dimensionality and permutation, they are regarded as being the same. FIG. 5A shows basis images obtained with 2nd-order PCA and FIG. 5B shows basis images obtained with 2nd-order ICA. Eventually, the 2nd-order ICA representation consists of a basis image (or vectors) $U = [U_{K1} \ U'_{K2}]^T$ and a coefficient matrix. The coefficient matrix B is defined by Equation (7):

$$B = XT \qquad (7)$$

where $T = [T_{K1} \ T'_{K2}]^T$ denotes a transformation matrix. Thus, if the basis image U has a fixed value, the facial image X is represented by the second ICA coefficients B derived from Equation (7). In this case, the transformation matrix T is precalculated from a training image set. Hereinbelow, the ICA coefficient matrix is referred to as first feature information.

When two facial images $x_1$ and $x_2$ represented by the ICA coefficients $b_1$ and $b_2$ ($b_1 = x_1 T$, $b_2 = x_2 T$) are given, similarity $d(b_1, b_2)$ is measured by calculating cross-correlation between them and defined by Equation (8):

$$d = \frac{b_1 \cdot b_2}{\|b_1\| \|b_2\|} \qquad (8)$$

where $b_1 \cdot b_2$ denote the inner product of vectors $b_1$ and $b_2$, and $\|b_1\|$ and $\|b_2\|$ denote the norms of vectors $b_1$ and $b_2$, respectively.

Four experimental results of the present invention will now be described. The configuration of experiments conducted according to this invention is summarized in Table 1. By conducting Experiments 1 and 2, different proposals such as results provided by NEC and POSTECH were compared with those provided by the present invention. 200 images were used as a training set for Version 1.0 descriptor (face_0066_01~face_0085_5 and face_0181_01~face_0200_5). A test set varies from experiment to experiment as can be seen in Table 1 below. Other experiments were performed on an MPEG-7 face dataset extended to VCE-4. The same training set as in the previous experiments was used in Experiment 3, and Experiment 4 was performed on a newly defined training set proposed in VCE-4 reflector by Kamei.

TABLE 1

| | | TEST SET | |
|---|---|---|---|
| | TRAINING SET | Illumination set | Pose set |
| Experiment 1 (M6001) | 200 images: 40 persons*5images /person face_0066_01~ face_0085_05 face_0181_01~ face_0200_05 | 745 images: 149persons*5images/ person face_0001_01- face_0065_05 face_0086_01- face_0169_05 | 410 images: 82persons*5images/ person face_0170_01- face_0180_05 face_0201_01- face_0271_05 |
| Experiment 2 (M7286) | | 350 images: 70persons*5images/ person face_0001_01- face_0035_05 face_0116_01- face_0150_05 | 205 images: 41persons*5images/ person face_0231_01- face_0271_05 |
| Experiment 3 | | 1015 images: 203persons*5images/ person | 1960 images: 392persons*5images/ person |

TABLE 1-continued

|  | TRAINING SET | TEST SET | |
| --- | --- | --- | --- |
|  |  | Illumination set | Pose set |
| Experiment 4 | 1685 images: 337 persons*5images /person (the image files whose person ID field is even + training set used by Version 1.0 descriptor) | 1490 images: 298 persons*5images/person (the image files whose person ID field is odd -training set used by Version 1.0 descriptor) | |

Tables 2 and 3 compare the results obtained with the method proposed by this invention with those obtained from Experiments 1 and 2 for other proposals. According to the results of Experiments 1 and 2, the 2nd-order ICA face descriptor was shown to produce poor results in a pose set but improved retrieval performance in an illumination set, compared to some proposals (Version 1.0, NEC, and POSTECH).

TABLE 2

|  | Illumination Set | | Pose Set | |
| --- | --- | --- | --- | --- |
|  | ANMRR | FIR | ANMRR | FIR |
| Ver1.0 | 0.234 (0.266*) | 0.125 (0.403*) | 0.492 (0.442*) | 0.354 (0.585*) |
| NEC | 0.214* | 0.342* | 0.348* | 0.491* |
| 2nd-order ICA | 0.202 | 0.097 | 0.467 | 0.290 |
| Component-based 2nd-order ICA | 0.152 | 0.071 | 0.326 | 0.205 |
| Manual alignment | 0.135 | 0.052 | 0.277 | 0.136 |

TABLE 3

|  | Illumination Set | | Pose Set | |
| --- | --- | --- | --- | --- |
|  | ANMRR | FIR | ANMRR | FIR |
| Ver1.0 | 0.270* | 0.414* | 0.318* | 0.466* |
| POSTECH | 0.236* | — | 0.234* | — |
| NEC | 0.226* | 0354* | 0.217* | 0.350* |
| 2nd-order ICA | 0.221 | 0.128 | 0.302 | 0.190 |
| Component-based 2nd-order ICA | 0.187 | 0.108 | 0.176 | 0.058 |
| Manual alignment | 0.170 | 0.082 | 0.159 | 0.043 |

TABLE 4

|  | Illumination Set | | Pose Set | |
| --- | --- | --- | --- | --- |
|  | ANMRR | FIR | ANMRR | FIR |
| Ver1.0 | 0.300 | 0.183 | 0.689 | 0.486 |
| 2nd-order ICA | 0.277 | 0.149 | 0.674 | 0.456 |
| Component-based 2nd-order ICA | 0.233 | 0.129 | 0.482 | 0.253 |
| Manual alignment | 0.236 | 0.131 | 0.383 | 0.172 |

In Experiment 4, the training dataset was extended as proposed in VCE reflector by Kamei.

Table 5 shows the results of Experiment 4.

TABLE 5

|  | ANMRR | FIR |
| --- | --- | --- |
| Ver1.0 | 0.499 | 0.306 |
| 2nd-order ICA | 0.367 | 0.205 |

As described above, the method of recognizing a face using 2nd-order ICA according to the present invention is robust and accurate despite variations in illumination conditions.

Preferred embodiments of the present invention will now be described in detail with reference to the accompanying drawings.

Figure 6:
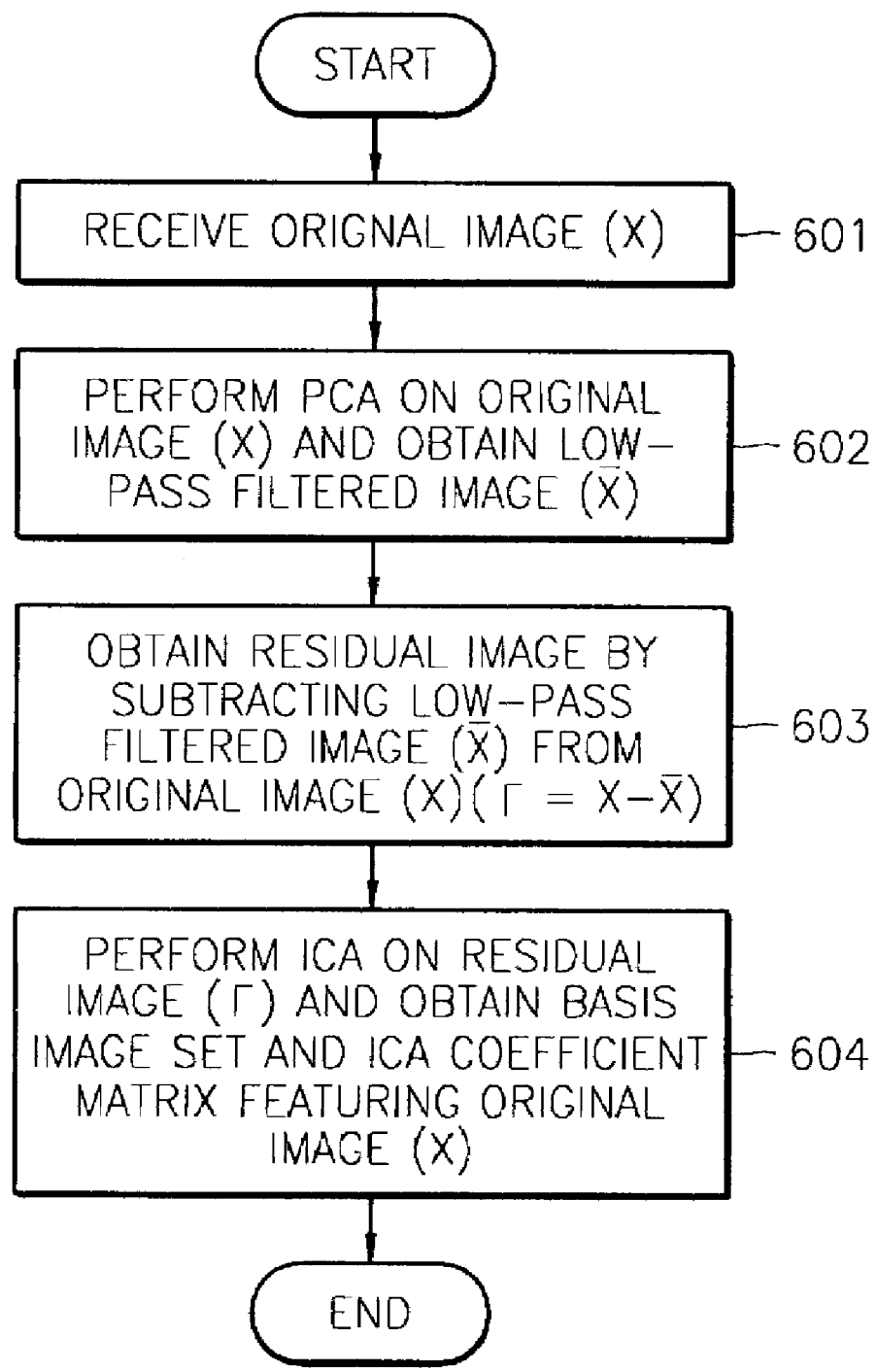
FIG. 6 is a flow chart diagram of a method of extracting 2nd-order ICA feature information according to the present invention.

FIG. 6 is a flow chart diagram of a method of extracting 2nd-order ICA feature information according to the present invention.

First, in step 601, original images X are received. In step 602, PCA is performed on the original images X to obtain low-pass filtered images X̄. In step 603, information on the low-pass filtered images X̄ is subtracted from information on the original images X to obtain the residual images Γ. In step 604, ICA is performed on the residual images Γ to obtain basis images, which is second ICA feature information featuring the original images X, and ICA coefficient matrix (first feature information corresponding to the facial image).

Details of steps 601 through 604 are the same as described above in Equations (1) through (8).

Figure 7:
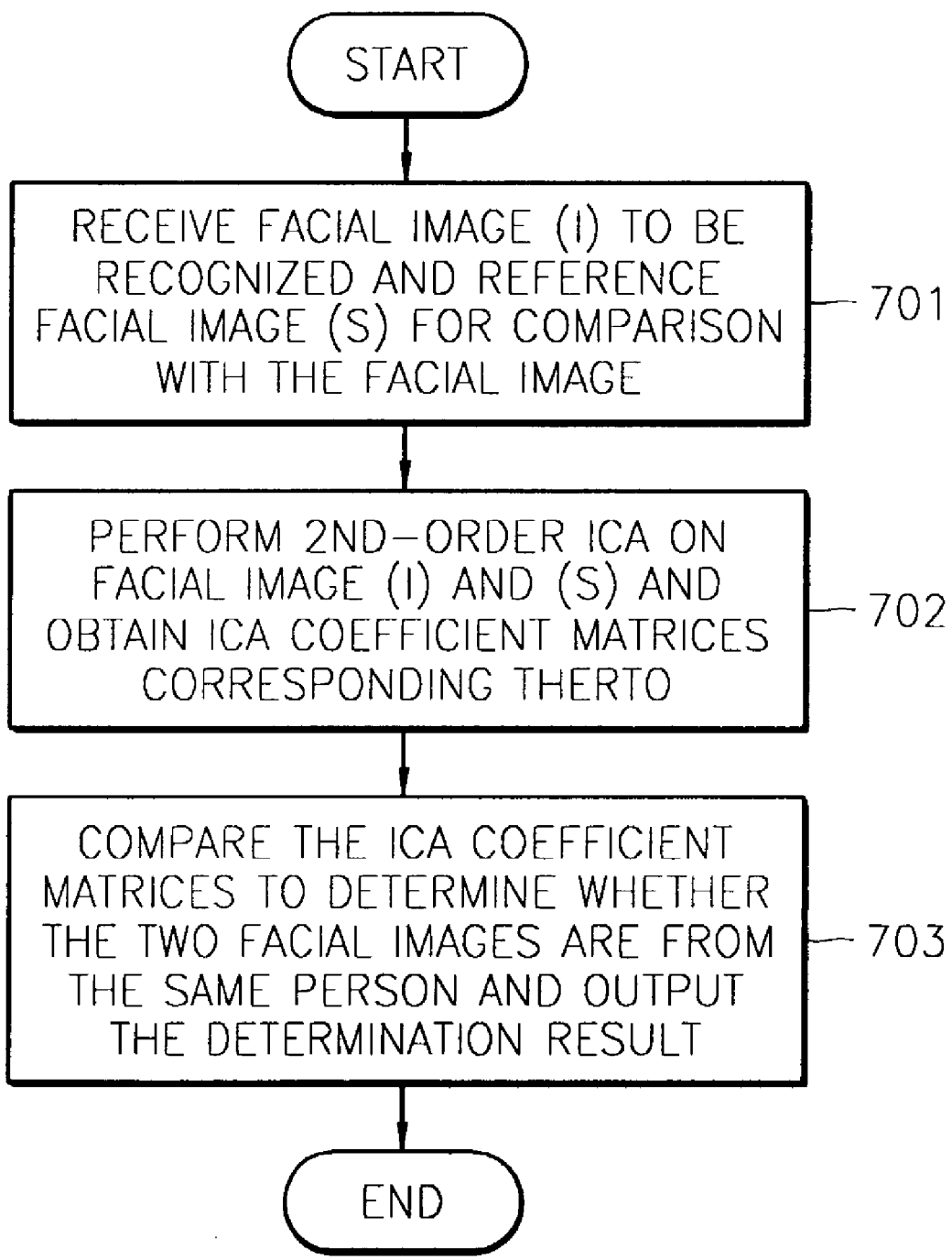
FIG. 7 is a flow chart diagram of a method of recognizing a face using 2nd-order ICA according to the present invention.

FIG. 7 is a flow chart diagram of a method of recognizing a face using 2nd-order ICA according to the present invention. In step 701, a facial image to be recognized and a facial image as a comparison basis are received. In step 702, 2nd-order ICA is performed each of the both facial images to obtain 2nd-order feature information corresponding to each facial image. In step 703, ICA coefficient vectors in the second ICA feature information are compared to determine whether the both facial images identify the same person and the comparison result is output. Here, a method of comparing ICA coefficient vectors of the both images is given in Equation (8). If the calculation result of Equation (8) is greater than a predetermined value, it is determined that the two facial images are from the same person.

Figure 8A:
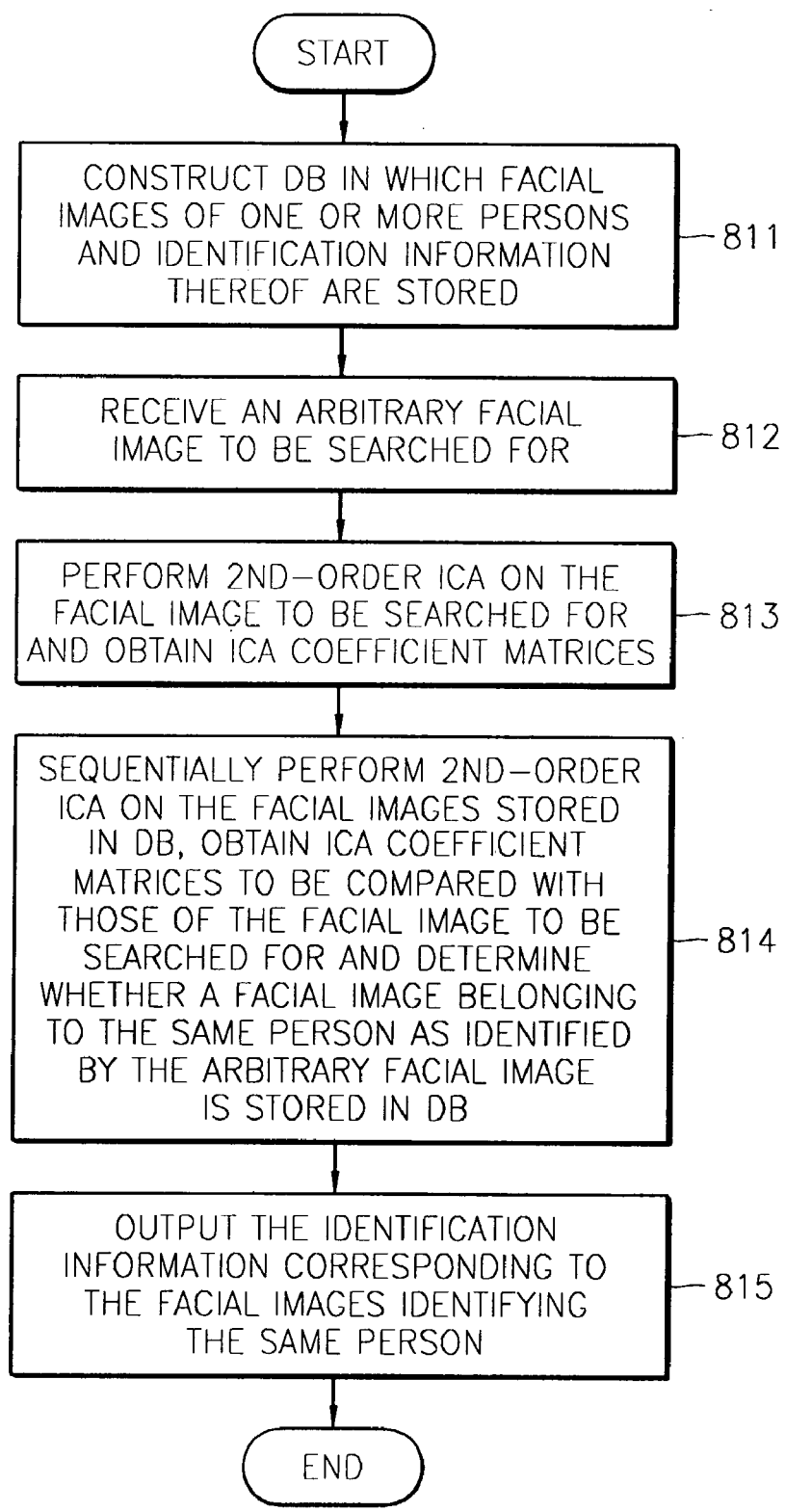
FIG. 8A is a flow chart diagram of a method of searching for a face using 2nd-order ICA according to an embodiment of the present invention.

FIG. 8A is a flow chart diagram of a method of searching for a face using 2nd-order ICA according to an embodiment of the present invention.

In step 811, a database (DB) in which facial images of one or more persons and identification information of the persons are stored, is prepared. In step 812, an arbitrary facial image to be searched for is received. In step 813, 2nd-order ICA is performed on the facial image to be searched for to obtain ICA coefficient vectors. In step 814, 2nd-order ICA is sequentially performed on the facial images stored in the DB to extract ICA coefficient vectors to then be compared with the ICA coefficient vectors of the facial image to be searched for, thereby determining whether a facial image belonging to the same person as identified by the arbitrary facial image is stored in the DB. If yes, the identification information corresponding to the facial image is output from the DB, in step 815.

Here, Equation (8) is used to determine whether the two face images identify the same person. If the solution of Equation (8) is greater than or equal to a predetermined value, it is determined that the facial images identify the same person.

Figure 8B:
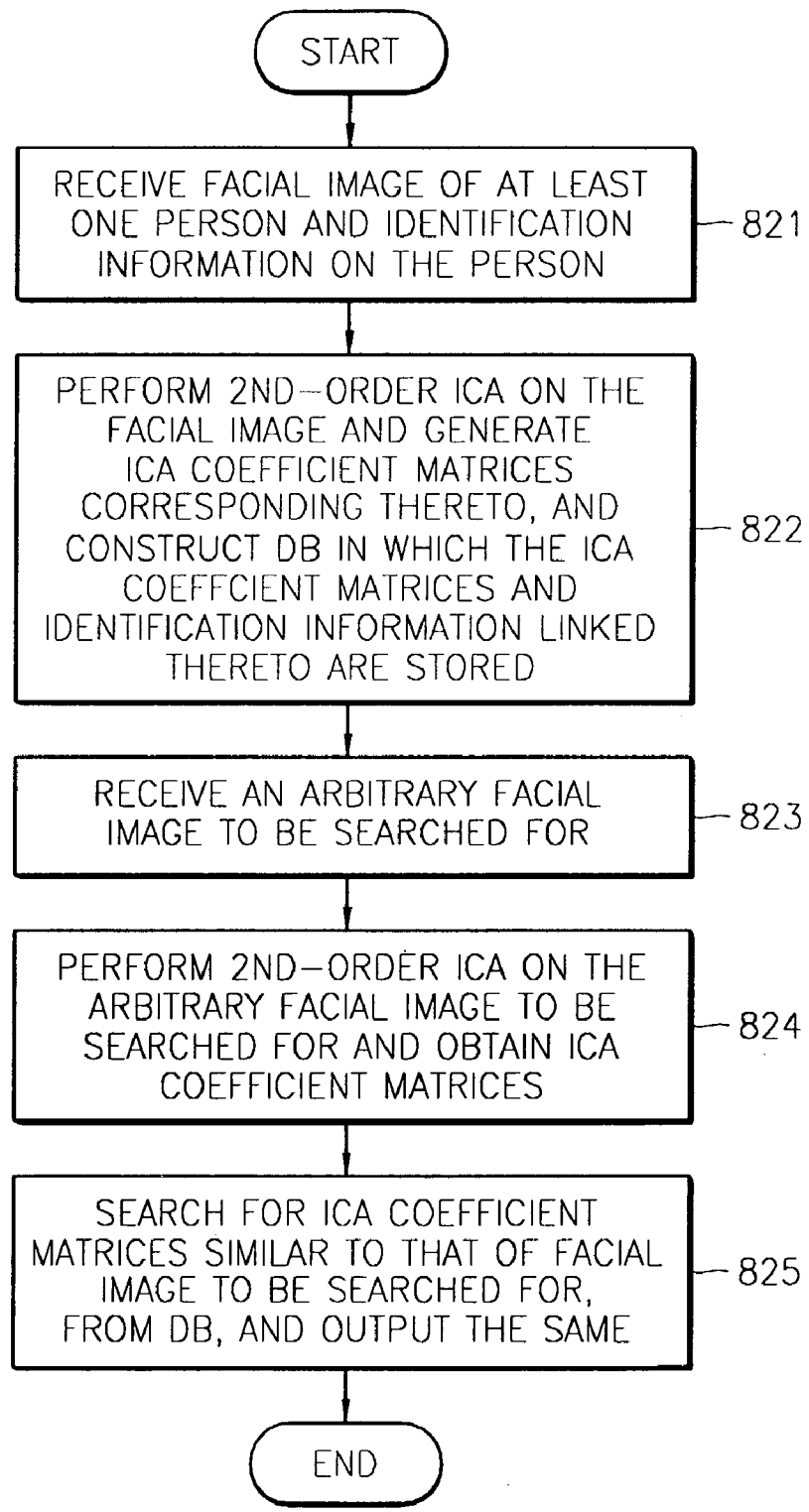
FIG. 8B is a flow chart diagram of a method of searching for a face using component-based ICA according to another embodiment of the present invention.

FIG. 8B is a flow chart diagram of a method of searching for a face using component-based ICA according to another embodiment of the present invention.

In step 821, a facial image of at least one person and identification information of the person are received. In step 822, 2nd-order ICA is performed on the facial image to obtain an ICA coefficient vector corresponding to the facial image, and the ICA coefficient vector and the identification information are linked to then be stored, thereby preparing a database (DB). In step 823, an arbitrary facial image to be searched for is received. In step 824, 2nd-order ICA is performed on the arbitrary facial image to be searched for to obtain an ICA coefficient vector corresponding thereto. In step 825, ICA coefficient vector similar to that of the facial image to be searched for is searched for from the DB and the search result is output.

Figure 9:
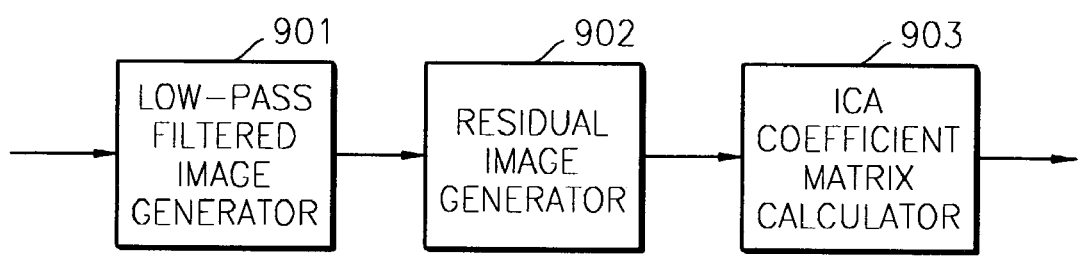
FIG. 9 is a block diagram of an apparatus of extracting 2nd-order ICA feature information implemented by the method shown in FIG. 6.

FIG. 9 is a block diagram of an apparatus of extracting 2nd-order ICA feature information implemented by the method shown in FIG. 6. The apparatus of extracting 2nd-order ICA feature information from a predetermined image includes a low-pass filtered image generator 901, a residual image generator 902, and an ICA coefficient matrix calculator 903.

The low-pass filtered image generator 901 receives an arbitrary image, performs PCA thereon and generates a low-pass filtered image by removing high-frequency components from the received image.

The residual image generator 902 subtracts the low-pass filtered image from the received image and generates residual images.

The ICA coefficient matrix calculator 903 performs ICA on the residual images and obtains basis images and an ICA coefficient matrix.

Figure 10:
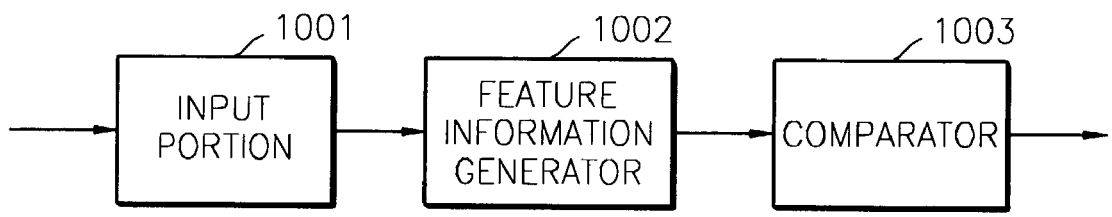
FIG. 10 is a block diagram of an apparatus of recognizing a face using 2nd-order ICA according to the present invention implemented by the method shown in FIG. 7.

FIG. 10 is a block diagram of an apparatus of recognizing a face using 2nd-order ICA according to the present invention implemented by the method shown in FIG. 7. The apparatus of recognizing a face using 2nd-order ICA includes an input portion 1001, a feature information generator 1002 and a comparator 1003.

The input portion 1001 receives an arbitrary facial image to be recognized and information on a basis facial image for the arbitrary facial image (a facial image which is a basis in determining whether the both facial images identify the same person, and supplies the received facial images to the feature information generator 1002.

The feature information generator 1002 has the same structure as and performs the same function as that of the feature information generating apparatus according to the present invention shown in FIG. 9. In other words, the feature information generator 1002 performs PCA on pieces of the information supplied from the input portion 1001 to generate low-pass filtered images, subtracts the low-pass filtered images from the received images to generate residual images, performs ICA on the residual images, and obtains basis images and an ICA coefficient matrix.

The comparator 1003 compares an ICA coefficient vector of a facial image, which is the subject of comparison, with that of the basis facial image to determine whether the two facial images identify the same person, and outputs the determination result.

Figure 11:
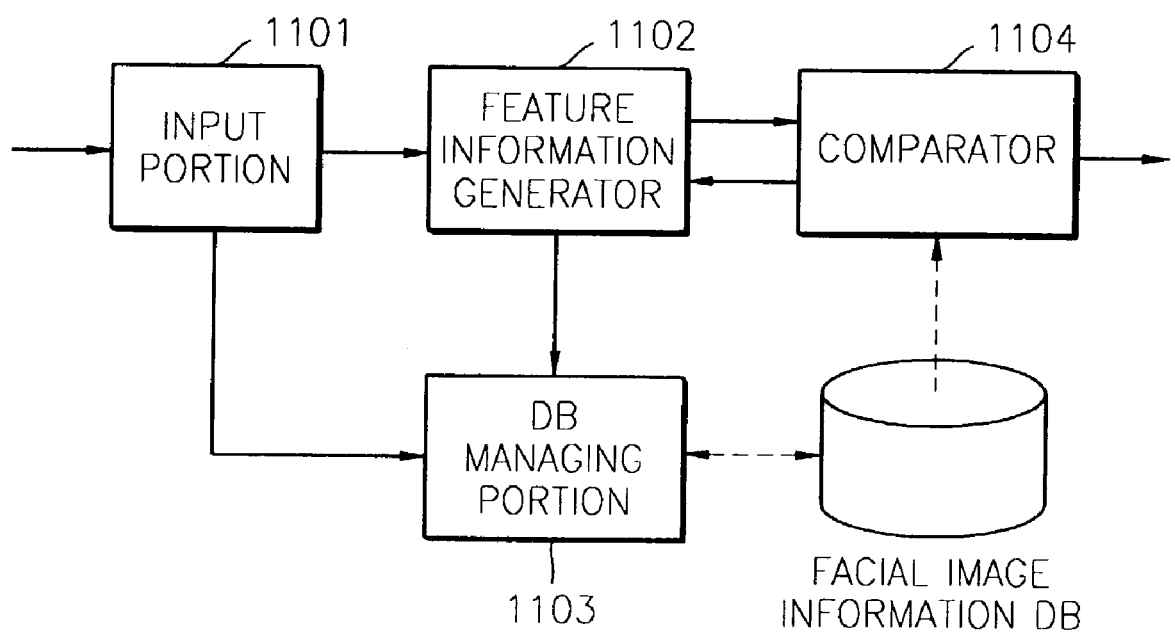
FIG. 11 is a block diagram of an apparatus of searching for a face using 2nd-order ICA according to the present invention implemented by the method shown in FIG. 8A or 8B.

FIG. 11 is a block diagram of an apparatus of searching for a face using 2nd-order ICA according to the present invention implemented by the method shown in FIG. 8A or 8B.

An input portion 1101 receives facial images necessary for constructing a facial images database (DB) for searching for a face, and supplies the same to a DB managing portion 1103 or a feature information generator 1102.

Also, the input portion 1101 receives a facial image to be searched for and supplies the same to the feature information generator 1102.

The feature information generator 1102 generates ICA coefficient vectors and a basis vector (or image) from the facial image supplied from the input portion 1101 using the process shown in FIG. 9. Here, if the facial image is to be stored in the facial image information DB, the feature information, that is, the ICA coefficient vectors and the basis vector (or image) are supplied to the DB managing portion 1103, and if not, the feature information is supplied to the comparator 1104. Also, the feature information generator 1102 receives facial image information read from the facial image information DB, extracts the feature information for the facial image and supplies the same to the comparator 1104.

The DB managing portion 1103 stores the facial image supplied from the input portion 1101 and the feature information supplied from the feature information generator 1102, in the facial image information DB, and manages the information stored in the facial image information DB.

The comparator 1104 receives the feature information of a facial image to be searched for, supplied from the feature information generator 1102, and searches for a facial image belonging to the same person as identified by the facial image to be searched for from the DB, using the feature information. If only the facial image is stored in the facial image information DB, the facial image information is read from the DB and supplies the same to the feature information generator 1102. Then, the comparator 1104 receives the feature information corresponding to the facial image and determines whether the received facial image belongs to the same person as identified by the facial image to be searched for. If the feature information of each facial image is stored in the facial image information DB, only the feature information is read from the DB to then be compared with the feature information of the facial image information to be searched for, thereby determining whether the both facial images are from the same person.

The above-described embodiments of the present invention can be prepared by a computer executable program, and can be implemented by a general-purpose digital computer operating the program using computer readable media. Various forms of the computer readable media include magnetic storage media, e.g., ROMs, floppy disks or hard disks, optically readable media, e.g., CD-ROMs or DVDs, and carrier waves, e.g., transmission over the Internet.

While this invention has been particularly shown and described with reference to preferred embodiments thereof, it will be understood by those skilled in the art that various changes in form and details may be made therein without departing from the spirit and scope of the invention as defined by the appended claims. Thus, the embodiments should not be construed as limiting this invention, but the true scope of which is determined by the following claims and their equivalents.

According to the present invention, human faces can be searched for using illumination invariant face descriptor and a specific individual can be authenticated.

While an original ICA subtracts independent components (i.e., independent basis components) from gray scale images, the proposed 2nd-order ICA is robust to illumination variation since it is applied to make the remaining images correspond to high pass frequency components.

What is claimed is:

1. A method of generating feature information using 2nd-order independent component analysis (ICA), the method comprising;
    (a) performing principal component analysis (PCA) on an input original image to generate a low-pass filtered image by removing high-frequency components from the original image;
    (b) calculating a difference between the low-pass filtered image and the original image to obtain a residual image having only the high frequency components; and
    (c) performing ICA on the residual image and generating feature information corresponding to the original image.

2. A computer-readable recording medium encoded with a computer program for executing the method claimed in claim 1 in a computer is recorded.

3. A method of recognizing a face using 2nd-order independent component analysis (ICA), the method comprising;
    (a) receiving a first facial image to be recognized and a second facial image to be used as a basis for comparison;
    (b) performing 2nd-order ICA on the first and second facial images, respectively, and extracting ICA coefficient vectors, wherein the performing 2nd-order ICA includes performing principal component analysis (PCA) on the first and second facial images, obtaining residual images by calculating a difference between images generated by the PCA and the first and second facial images, and performing ICA on the residual images; and
    (c) determining whether there is a similarity between the ICA coefficient vectors corresponding to the first and second facial images, and outputting the determination result.

4. The method of claim 3, wherein the step (b) comprises:
    performing PCA on the first and second facial images to generate low-pass filtered images corresponding thereto by removing high-frequency components from the first and second facial images;
    calculating a difference between the low-pass filtered images and the first and second facial images to obtain the residual images having high-frequency components, respectively; and
    performing ICA on the residual images corresponding to the first and second facial images and generating the ICA coefficient vectors corresponding to the first and second facial images.

5. The method of claim 3, wherein the step (c) comprises determining whether the first and second facial images correspond to a same person by comparing a value obtained by dividing an inner product of a pair of vectors corresponding to the first and second facial images by a product of norms of the pair of vectors to a predetermined value.

6. A computer-readable recording medium encoded with a computer program for executing the method claimed in claim 3 in a computer is recorded.

7. A method of searching for a face using 2nd-order independent component analysis (ICA), the method comprising:
    (a) constructing a database (DB) in which facial images of one or more persons and identification information of the persons are stored;
    (b) receiving a facial image to be searched for;
    (c) performing the 2nd-order ICA on the facial image to be searched for and generating ICA coefficient vectors for the facial image to be searched for, wherein the performing the 2nd-order ICA includes performing principal component analysis (PCA) on the facial image to be searched for, obtaining a residual image by calculating a difference between an image generated by the PCA and the facial image to be searched for, and performing ICA on the residual image;
    (d) sequentially reading the facial images stored in the DB, and performing the 2nd-order ICA on a facial image read from the DB and generating ICA coefficient vectors for the facial image read from the DB;
    (e) comparing the ICA coefficient vectors corresponding to the facial image read from the DB with the ICA coefficient vectors corresponding to the facial image to be searched for, and determining whether the facial images correspond to a same person; and
    (f) if it is determined that the facial images correspond to the same person, reading identification information corresponding to the facial image from the DB and outputting the identification information.

8. The method of claim 7, wherein the ICA coefficient vectors are generated by:
    performing PCA on the facial image to generate a low-pass filtered image by removing high-frequency components from the facial image;
    calculating a difference between the low-pass filtered image and the facial image to obtain the residual image corresponding to the facial image; and
    performing ICA on the residual image and generating the ICA coefficient vectors.

9. The method of claim 7, wherein the step (e) comprises determining whether the facial image read from the DB and the facial image to be searched for correspond to the same person by comparing a value obtained by dividing an inner product of a pair of vectors corresponding to same components of the facial image read from the DB and the facial image to be searched for by a product of absolute values of the pair of vectors to a predetermined value.

10. A computer-readable recording medium encoded with a computer program for executing the method claimed in claim 7 in a computer is recorded.

11. A method of searching for a face using 2nd-order independent component analysis (ICA), the method comprising:
    (a) constructing a database (DB) in which ICA coefficient vectors corresponding to facial images of one or more persons and identification information of the persons are stored;
    (b) receiving a facial image to be searched for that identifies a person;
    (c) performing the 2nd-order ICA on the facial image to be searched for and generating ICA coefficient vectors corresponding to the facial image to be searched for, wherein the performing the 2nd-order ICA includes performing principal component analysis (PCA) on the facial image to be searched for, obtaining a residual image by calculating a difference between an image generated by the PCA and the facial image to be searched for, and nerforming ICA on the residual image; and
(d) identifying and outputting ICA coefficient vectors stored in the DB corresponding to a facial image of the person identified by the facial image to be searched for according to a decree of similarity between the ICA coefficient vectors stored in the DB and the ICA coefficient vectors corresponding to the facial image to be searched for.

12. The method of claim 11, wherein the step (c) comprises:
performing PCA on the facial image to be searched for to generate a low-pass filtered image by removing high-frequency components from the facial image;
calculating a difference between the low-pass filtered image and the facial image to be searched for to obtain the residual image corresponding to the facial image to be searched for; and
performing ICA on the residual image and generating the ICA coefficient vectors.

13. A computer-readable recording medium encoded with a computer program for executing the method claimed in claim 11 in a computer is recorded.

14. An apparatus for generating feature information comprising:
a low-pass filtering portion which performs principal component analysis (PCA), on an input original image to generate a low-pass filtered image by removing high-frequency components from the original image;
a residual image generator which calculates a difference between the low-pass filtered image and the input original image to generate a residual image having only the high frequency components; and
an independent component analysis ICA coefficient matrix calculator which performs ICA on the residual image and generates feature information corresponding to the original image.

15. An apparatus for recognizing a face using 2nd-order independent component analysis (ICA), the apparatus comprising:
an input portion which receives a first facial image to be recognized and a second facial image to be used as a basis for comparison with the first facial image;
a feature information generator which performs 2nd-order ICA on the first and second facial images and generates ICA coefficient matrices, wherein the feature information generator performs principal component analysis (PCA) on the first and second facial images, obtains residual images by calculating a difference between images generated by the PCA and the first and second facial images, and performs ICA on the residual images; and
a comparator which compares an ICA coefficient vector corresponding to the first facial image with an ICA coefficient vector corresponding to the second facial image to determine whether there is a similarity between the first and second facial images and outputs the determination result.

16. The apparatus of claim 15, wherein the feature information generator comprises:
a low-pass filtering portion which performs PCA on the first and second facial images to generate respective low-pass filtered images by removing high-frequency components from the original image;
a residual image generator which calculates a difference between the low-pass filtered images and the first and second facial images to generate the residual images having the high-frequency components; and
an ICA coefficient matrix calculator which performs ICA on the residual images and generates feature information corresponding to the the first and second facial images.

17. An apparatus for searching for a face using 2nd-order independent component analysis (ICA), the apparatus comprising:
an input portion which receives facial images for constructing a facial image information database (DB);
a feature information generator which performs 2nd-order ICA on the received facial images and generates feature information corresponding to the received facial images, wherein the feature information generator performs principal component analysis (PCA) on the received facial images, obtains residual images by calculating a difference between images generated by the PCA and the received facial images, and performs ICA on the residual images;
a DB managing portion which stores the feature information corresponding to the received facial images and manages the feature information to be stored in the DB; and
a comparator which receives feature information corresponding to a facial image to be searched for from the feature information generator and searches for feature information stored in the DB having a decree of similarity to the feature information to be searched for based on a predetermined reference value to determine whether the facial image to be searched for and a facial image corresponding to the feature information stored in the DB are from a same person.

18. The apparatus of claim 17, wherein the DB managing portion receives and stores the facial images used in constructing the DB from the input portion,
wherein the comparator sequentially reads the facial images in the DB and supplies the facial images to the feature information generator, receives feature information corresponding to a facial image in the DB, compares the received feature information with the feature information corresponding to the facial image to be searched for to obtain the degree of similarity between the facial images, and determines whether the facial image to be searched for and the facial image in the DB are from the same person according to the degree similarity, and
wherein the feature information generator receives the facial image to be searched for from the input portion and the facial image in the DB from the comparator, performs the 2nd-order ICA on the facial images and generates feature information corresponding to the facial images to supply to the comparator.

19. The apparatus of claim 17, wherein the feature information includes ICA coefficient vectors.

20. The apparatus of claim 17, wherein the feature information generator comprises:
a low-pass filtering portion which performs PCA on the received facial images to generate low-pass filtered images by removing high-frequency components from the original image;
a residual image generator which calculates a difference between the low-pass filtered images and the received facial images to generate the residual images having the high-frequency components; and
an ICA coefficient matrix calculator which performs ICA on the residual images and generates feature information corresponding to the received facial images.

* * * * *